(12) United States Patent
Painter et al.

(10) Patent No.: US 11,027,993 B2
(45) Date of Patent: *Jun. 8, 2021

(54) OIL SANDS TAILINGS TREATMENT

(71) Applicant: EXTRAKT PROCESS SOLUTIONS, LLC, Bowling Green, KY (US)

(72) Inventors: Paul C. Painter, Boalsburg, PA (US); Bruce G. Miller, Boalsburg, PA (US); Aron Lupinsky, Boalsburg, PA (US)

(73) Assignee: EXTRAKT PROCESS SOLUTIONS, LLC, Bowling Green, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,479

(22) Filed: Dec. 6, 2016

(65) Prior Publication Data

US 2017/0320759 A1    Nov. 9, 2017

Related U.S. Application Data

(60) Provisional application No. 62/332,116, filed on May 5, 2016, provisional application No. 62/351,476, filed on Jun. 17, 2016.

(51) Int. Cl.
| | | |
|---|---|---|
| *C02F 1/52* | (2006.01) | |
| *C02F 1/56* | (2006.01) | |
| *C02F 1/68* | (2006.01) | |
| *C02F 11/121* | (2019.01) | |
| *C02F 103/10* | (2006.01) | |

(52) U.S. Cl.
CPC .............. *C02F 1/52* (2013.01); *C02F 1/5236* (2013.01); *C02F 1/56* (2013.01); *C02F 1/68* (2013.01); *C02F 11/121* (2013.01); *C02F 2103/10* (2013.01)

(58) Field of Classification Search
CPC ....................................................... C02F 1/52
See application file for complete search history.

(56) References Cited

U.S. PATENT DOCUMENTS

| 3,963,599 A | 6/1976 | Davitt |
| 4,225,433 A | 9/1980 | Liu et al. |

(Continued)

FOREIGN PATENT DOCUMENTS

| EP | 0 787 540 A1 | 8/1997 |
| EP | 1 790 732 A1 | 5/2007 |

(Continued)

OTHER PUBLICATIONS

International Search Report issued in Application No. PCT/US2017/030882 dated Aug. 2, 2017.

(Continued)

*Primary Examiner* — Peter Keyworth
(74) *Attorney, Agent, or Firm* — Morgan, Lewis & Bockius LLP

(57) ABSTRACT

Processes of consolidating oil sands tailings which includes fines and process water are disclosed. The processes include mixing the oil sands tailings with a highly water soluble salt or an aqueous solution thereof to destabilize and consolidate solids in the tailings, e.g., to destabilize and consolidate fines in the tailings and separating the consolidated solids from the process water. A water soluble polymer and coarse particles, e.g., sand, can also be used in the treatment of oil sands tailings.

19 Claims, 9 Drawing Sheets

(56) References Cited

U.S. PATENT DOCUMENTS

| | | | |
|---|---|---|---|
| 4,270,609 A | 6/1981 | Choules | |
| 4,376,693 A | 3/1983 | Warzel | |
| 4,399,039 A | 8/1983 | Yong | |
| 4,676,908 A * | 6/1987 | Ciepiela | B01D 61/025 204/524 |
| 4,919,906 A | 4/1990 | Barber | |
| 7,875,188 B2 | 1/2011 | Dymond et al. | |
| 2003/0084693 A1 | 5/2003 | Sower | |
| 2009/0127205 A1 | 5/2009 | Sikes et al. | |
| 2010/0006510 A1 | 1/2010 | Dymond et al. | |
| 2010/0102006 A1* | 4/2010 | Quevillon | B01D 21/18 210/713 |
| 2011/0131873 A1 | 6/2011 | Soane et al. | |
| 2012/0145645 A1* | 6/2012 | Wietholter | C02F 1/5236 210/723 |
| 2012/0175315 A1 | 7/2012 | Revington et al. | |
| 2013/0056395 A1 | 3/2013 | Pierre, Jr. et al. | |
| 2013/0075340 A1 | 3/2013 | Bara et al. | |
| 2013/0105401 A1 | 5/2013 | Suh et al. | |
| 2013/0112561 A1 | 5/2013 | Jajuee et al. | |
| 2013/0313167 A1* | 11/2013 | Vandemierden | B03B 9/04 209/214 |
| 2014/0116955 A1 | 5/2014 | Lorentz et al. | |
| 2014/0116956 A1 | 5/2014 | Yuan et al. | |
| 2014/0150886 A1 | 6/2014 | Kan et al. | |
| 2014/0238943 A1* | 8/2014 | Favero | C02F 1/56 210/734 |
| 2015/0027929 A1 | 1/2015 | Watson et al. | |
| 2016/0089706 A1 | 3/2016 | Read et al. | |
| 2017/0101332 A1 | 4/2017 | Soane et al. | |
| 2017/0369788 A1 | 12/2017 | Lupinsky et al. | |
| 2018/0127290 A1* | 5/2018 | Utting | C02F 1/56 |

FOREIGN PATENT DOCUMENTS

| | | |
|---|---|---|
| EP | 2349945 A1 | 8/2011 |
| EP | 2477708 A1 | 7/2012 |
| EP | 2989163 A1 | 3/2016 |
| WO | 2014173624 A1 | 10/2014 |
| WO | 2015083069 A1 | 6/2015 |
| WO | 2015/180900 A1 | 12/2015 |
| WO | 2016/174582 A1 | 11/2016 |
| WO | 2017/108930 A1 | 6/2017 |
| WO | 2017/192748 A1 | 11/2017 |
| WO | 2018/144336 A1 | 8/2018 |
| WO | 2019/018370 A2 | 1/2019 |
| WO | 2019/023054 A1 | 1/2019 |
| WO | 2019/023057 A2 | 1/2019 |

OTHER PUBLICATIONS

Written Opinion issued in International Application No. PCT/US2017/030882 dated Aug. 2, 2017.
Kotlyar et al., "Effect of Salt on the Flocculation Behavior of Nano Particles in Oil Sands Fine Tailings", Clays and Clay Minerals, 1996:44:121-131.
Wang et al., "Current state of fine mineral tailings treatment: A critical review on theory and practice", Minerals Engineering 2014:58:113-131.
Gregory et al., "Hydrolyzing metal salts as coagulants", J. Pure Appl. Chem. 2001:73:2017-2026.
Hogg et al. Int., "Flocculation and dewatering" J. Min. Process. 2000:58:223-236.
Sworska et al., "Flocculation of the Syncrude fine tailings Part II. Effect of hydrodynamic conditions", Int. J. Min. Proc. 2000:60:153-161.
OSTC 2012, Technical Guide for Fluid Fine Tailings Management, Oil Sands Tailings Consortium, Aug. 30, 2012.
Rao, "Flocculation and Dewatering of Alberta Oil Sands Tailings" International Journal of Mineral Processing, 1980:7(3):245-253.
Council of Canadian Academies, Technological Prospects for Reducing the Environmental Footprint of Canadian Oil Sands, 2015.
Duan et al., "Coagulation by hydrolysing metal salts", Advances in Colloid and Interface Science, 2003:100-102:475-502.
International Search Report and Written Opinion issued in International Application No. PCT/US2018/015423 dated Apr. 13, 2018.
Written Opinion and International Search Report issued in International Application No. PCT/US2018/043067 dated Nov. 1, 2018.
Darrell Stonehouse, "Titanium Corporation wants to green oilsands tailings while extracting value from waste," JWN Energy, https://www.jwenergy.com/titanium-corporation-wants-green-froth-treatment-tailings-stream-while-extracting-value-out-bitumen-and-heavy-mineral-content/, Oct. 6, 2016.
Chemical Book, "Ammonium dihydrogen phosphate", Sep. 24, 2016, https://web.archive.orga/web/20160924151625/http://www.chemicalbook.com/ChemicalProductProperty_EN_CB6131092.htm.
International Search Report and Written Opinion issued in International Application No. PCT/US2018/042450 dated Feb. 7, 2019.
International Search Report and Written Opinion issued in International Application No. PCT/US2018/043077 dated Feb. 21, 2019.

* cited by examiner

Vials 1 week after re-shaking

Water     10% NaCl     10% NH₄Cl
25% NaCl     25% NH₄Cl

Water    NH₄Cl/PAM    NH₄Cl/anionic PAM
NH₄Cl    NH₄Cl/PAM copolymer    NH₄Cl + cationic PAM

OIL SANDS TAILINGS TREATMENT

CROSS-REFERENCE TO RELATED APPLICATIONS

This application claims the benefit of U.S. Provisional Application No. 62/332,116 filed May 5, 2016 and U.S. Provisional Application No. 62/351,476 filed Jun. 17, 2016 the entire disclosures of each of which are hereby incorporated by reference herein.

TECHNICAL FIELD

The present disclosure relates to dewatering and consolidation of oil sands tailings, e.g., tailings from the extraction of bitumen from oil sands solids.

BACKGROUND

Oil sands tailings are a waste by-product of extracting bitumen from oil sands. The tailings are typically discharged into large ponds which are growing faster than processes to remediate the tailings.

A simplified illustration of tailings production as a result of bitumen extraction is illustrated in FIG. 1. As illustrated, oil sands are mined to extract bitumen. Extraction of bitumen from oil sands involves the use of significant amounts of energy and heated water. Approximately 9 barrels of water are required for every barrel of oil produced. Water, sodium hydroxide (NaOH) and other additives are mixed with the oil sands to form a slurry. The NaOH releases surfactants from the oil sands and improves bitumen recovery. The slurry is conditioned by mixing and/or shearing the slurry to detach bitumen from the oil sands particles. Bitumen is separated from water by aeration to form an oil containing froth that can be skimmed off the surface of the water. After further treatment to remove fines and process water, the extracted bitumen is sent to a refinery for upgrading. Process water, coarse sand particles and mineral fine particles are discharged into tailings ponds. The whole tailings is a complex mixture of alkaline water, dissolved salts, residual bitumen and other organics, surfactants and solid particles, e.g., sand, clay, silt and trace metals, etc.

Tailings ponds partially separate the solids from the water through gravity so that some of the surface water can be recycled into the extraction process. Four layers are typically formed in such tailings ponds. FIG. 2 illustrates the layers of sedimentation in a typical oil sands tailings pond. As illustrated, the tailings pond includes a layer of coarse sand (18), which settles to the bottom of the pond relatively quickly. Water with some entrained fines, e.g. solids having a size of no more than 44 microns, sit on the surface (12) and is reused in the process. However, most of the fines (mainly silica and clay particles) form an intermediate layer of so-called fluid fine tailings (FFT) (14), which is also contaminated with residual bitumen, organics, solvents and chemicals used as processing aids in the bitumen extraction process. Over time, this mixture undergoes additional settling to form a distinct layer of so-called mature fine tailings (MFT) (16). It is believed that the presence of sodium chloride, the main electrolyte present in tailings water, stabilizes the sludge-like formation of MFT. See Kotlyar et al, Clays and Clay Minerals, 1996:44:121-131.

MFT contain about 30 wt % or more solids (on average) and has a sludge-like consistency that makes it difficult to handle and dewater. It has been estimated that mature fine tailings can be stable for centuries without further densification. See, e.g., Wang et al. Minerals Engineering, 2014: 58:113-131. Because of the scale of oil sands operations, tailings ponds covered an area of at least 175 km$^2$ in 2011. The management of legacy tailings ponds is a thus a very large problem for the oil sands industry. And the problem continues to grow as production rates exceed remediation efforts.

In 2009, the Alberta Energy Regulator implemented Directive 074, aimed at reducing the inventory of fluid tailings and their conversion into trafficable deposits. This directive specified a minimal trafficable shear strength for consolidated tailings. Shear strength is the amount of force a soil can sustain. Sludge has a low shear strength and cannot sustain any weight or pressure; this soft material is therefore non-trafficable. A trafficable landscape requires a shear strength high enough so the ground can sustain people and equipment without sinking. The shear strength of fine tailings is mostly a function of water content. An effective shear strength of 5 kPa equates to approximately 65% solids and 35% water. Removing water from the fines is a pivotal first step to reclaiming the landscape. However, an effective shear strength of 5 kPa does not provide a trafficable surface.

Various approaches have been used to dewater and consolidate the solids of MFT. Some approaches are summarized in a recent review and in a report from the Council of Canadian Academies. See Wang et al. Minerals Engineering 2014:58:113-131; and Council of Canadian Academies, *Technological Prospects for Reducing the Environmental Footprint of Canadian Oil Sands*, 2015. One method involves a freeze-thaw approach, where MFT placed in shallow pits is allowed to freeze in the winter. The following summer, it thaws and evaporative dewatering occurs. However, this method requires enormous surface areas and would be highly dependent on weather and season. Another method involves combining mature fine tailings with sand and gypsum to form so-called "consolidated tailings." However, the composition of the blend needs to be tightly controlled, or the mixture segregates. In addition, a high proportion of sand to fines (solids) is required, at least 4 to 1. Even so, the resulting material still does not have the necessary strength for land reclamation and requires containment dikes. So-called "end pit lakes" are also under consideration, but their ultimate environmental impact is a major concern.

Other methods have attempted to treat MFT with the addition of chemicals to flocculate the fines and create a thickened paste that will solidify and eventually dewater. For example, polymers such as polyacrylamide and its derivatives can act as flocculating agents and have been a component disclosed in a number of patents and patent applications. See U.S. Pat. No. 4,399,039; EP 2477708 A1; EP 2349945 A1; US 20130112561 A1; US 20140150886 A1; EP 2989163 A1. However, even when the resulting mixture is centrifuged, the extent of dewatering remains insufficient for reclamation purposes. Typically, solids contents of about 55% are achieved and it has been noted that the resulting solid paste has "roughly the consistency of toothpaste". (Council of Canadian Academies, *Technological Prospects for Reducing the Environmental Footprint of Canadian Oil Sands*, 2015.)

Hydrolyzing salts, salts that hydrolyze to produce hydroxide ions when dissolved in water, such as alum (aluminum sulfate, $Al_2(SO_4)_3$) and ferric chloride ($FeCl_3$), have been used in municipal water treatment plants to coagulate and settle fine mineral particles. See, e.g., Gregory et al., J. Pure Appl. Chem. 2001:73:2017-2026 Lime (CaO) was disclosed for use as a coagulating agent for whole tailings. See U.S.

Pat. No. 4,225,433. This patent discloses that mixing the hydrolyzing salt with whole tailings prior to settling can agglomerate fines with coarse particles with the result that the fines co-settle with the coarse particles.

Hydrolyzing salts work, in part, by reacting with water to form hydroxides, which precipitate from the water. In practice, these coagulants are overdosed and the resulting rapid precipitation of the metal hydroxide enmeshes and captures solid particles in the form of a floc. See, Duan et al., Advances in Colloid and Interface Science 2003:100-102: 475-502; Wang et al., Minerals Engineering 2014:58:113-131.

Although incorporation of fine particles into flocs allows for settling under gravity in applications such as water clarification, the structure of these flocs is very open and contains large amounts of water. See Hogg, Int. J. Min. Proc. 2000:58:223-236. These flocs were formed using polyacrylamide as a flocculating agent and do not have the high solids content desired for consolidated tailings.

Other approaches to dewatering tailings include treating tailings with a solution of a polymer and salt. See WO2015/083069 and WO2014/173624. WO2015/083069 discloses using a salt to lower the viscosity of a polymer solution which is believed to improve contact of mineral particles with the polymer. WO2014/173624 discloses treating an aqueous suspension of mineral particles with a water soluble polymer and a calcium and/or magnesium salt. Both references disclose using low concentrations of salt.

However, there is a continuing need to manage and treat oil sands tailings to reduce such tailings and/or to dewater and consolidate solids in such tailings and in a manner preferable for land reclamation and remediation.

SUMMARY OF THE DISCLOSURE

Advantages of the present disclosure include processes to dewater oil sands tailings to produce high solids content materials.

These and other advantages are satisfied, at least in part, by a process of consolidating oil sands tailings. The process comprises treating the oil sands tailings, which includes fines and process water, with a highly water soluble salt. Advantageously, the process can include treating the oil sands tailings with at least one highly water soluble salt or solution thereof, at least one polymer flocculant or solution thereof, and coarse particles, e.g., sand, to form a treated tailings. The treated tailings can include a consolidated material in the process water. The process water can then be advantageously separated from the consolidated material.

Embodiments of the processes include one or more of the following features individually or combined. For example, the oil sands tailings can be mature fine tailings. In some embodiments, the at least one highly water soluble salt can have a solubility in water (a salt/water solubility) of at least about 5 g/100 g at 20° C., e.g., at least about 10 g/100 g at 20° C. In other embodiments, the at least one highly water soluble salt is a non-hydrolyzing salt. In still further embodiments, the at least one highly water soluble salt can have a monovalent cation and can include an ammonium based salt, a phosphate based salt, or a sulfate based salt.

In certain embodiments, the treated tailings can have a salt-tailings concentration of at least 0.5 wt % of the at least one highly water soluble salt and preferably no less than about 1 wt %, such as at least about 2 wt % and even greater than about 3 wt %, 4 wt %, 5 wt %, etc. of the at least one highly water soluble salt. In some embodiments, the treated tailings can have a polymer-tailings concentration of the at least one polymer flocculant of no less than about 0.005 wt %, e.g., no less than about 0.01 wt % or 0.04 wt %. In other embodiments, the treated tailings can have a sand to fines ratio of less than 4:1, e.g., between about 2.5:1.0 to 0.5:1 or between about 0.75:1 and 2.25:1.

In various embodiments, treating the tailings can include combining the oil sands tailings with a solution including the at least one highly water soluble salt and the at least one polymer flocculant. In some embodiments, treating the tailings can include combining a stream of the oil sands tailings with a stream of a solution including the at least one highly water soluble salt and the at least one polymer flocculant and mixing the streams with sand.

In still further embodiments, the process water can be separated from the consolidated material by any one or more of decanting, filtering, vacuuming, gravity draining, or electrofiltering. In various embodiments, separating the process water from the consolidated material can include mechanically dewatering the consolidated material, e.g., mechanically dewatering the consolidated material by a dewatering screw.

In practicing aspects of the processes of the present disclosure and the various embodiments thereof, the separated process water can include the at least one highly water soluble salt and the process can further comprise recovering at least a portion of the separated process water. In some embodiments, the process can further comprise recycling at least a portion of the recovered separated process water to treat additional oil sands tailings. In other embodiments, the process can further include purifying at least a portion of the recovered process water.

Advantageously, the processes of the present disclosure can consolidate the solids of the tailings to produce a consolidated material having a solids content in excess of about 45% by weight, e.g., a solids content of greater than about 50% and higher than about 60%, 65%, 70% and 75% by weight.

In practicing certain aspects of the processes of the present disclosure and the various embodiments thereof, the consolidated material formed in the treated tailings according to certain embodiments can result in a high solids content after mixing and/or dewatering the treated tailings in a short period of time, e.g., less than about 10 minutes. In some embodiments, the consolidated material can have a solids content of greater than about 50% and at least about 60%, 65%, 70%, 75% and 80% by weight in less than about 5 minutes, such as less than about 2 minutes and preferably less that, about 1 minute after mixing and/or dewatering.

Another aspect of the present disclosure includes an aqueous solution for treating oil sands tailings. The aqueous solution includes a highly water soluble ammonium based salt and a polymer flocculant, e.g., a water soluble polymer. Embodiments include, together or individually, an aqueous solution of one or more of the highly water soluble salt(s) and having a concentration of no less than about 1 wt %, e.g., at least about 2 wt %, 5 wt %, 10 wt %, 20 wt %, 30 wt % and even as great as a 40 wt % or as an aqueous salt slurry. The aqueous solution can also include one or more of the polymer flocculant(s) and having a concentration of no less than about 0.005 wt %, e.g. no less than about 0.01 wt %, 0.04 wt %, 0.05 wt %, 0.1 wt %, 0.2 wt %, 0.4 wt %, for example Yet another aspect of the present disclosure includes recovering residual bitumen from the oil sands tailings and/or recovering consolidated materials from the tailings and the recovered bitumen and consolidated materials.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 11A shows consolidated solids collected and draining and FIG. 11B shows the consolidated solids and after being pressed between paper towels.

DETAILED DESCRIPTION OF THE DISCLOSURE

Figure 1:
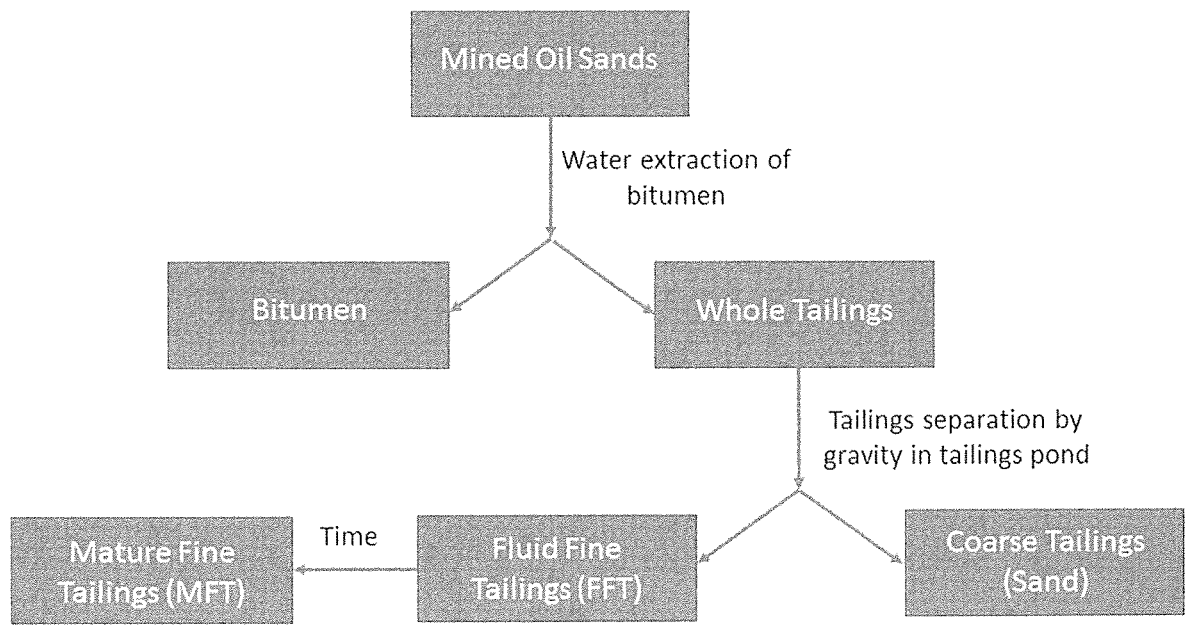
FIG. 1 schematically illustrates tailings production as a result of bitumen extraction.
Figure 2:
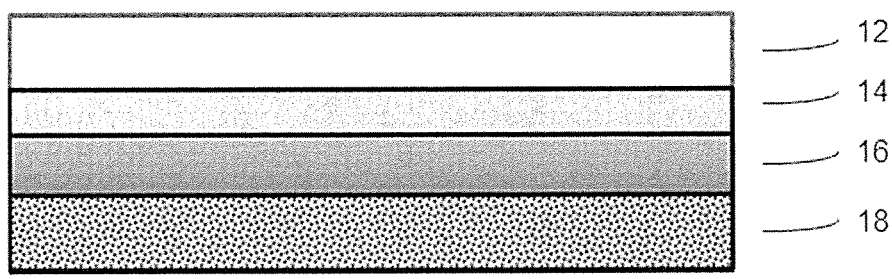
FIG. 2 is schematic illustration of a typical sedimentation of an oil sands tailings pond.

The present disclosure relates to treating oil sands tailings, and in particular, mature fine tailings, to consolidate and dewater the tailings. Advantageously, the process of the present disclosure can consolidate the solids of the tailings to produce consolidated material having a solids content in excess of about 45% by weight, e.g., a solids content of greater than about 50% and higher than about 60%, 65%, 70% and 75% by weight.

As described in the background section, oil sands tailings are a waste by-product of the process of extracting bitumen from oil sands and include process water, sand, fines, and residual bitumen. Oil sands tailings can be characterized as a suspension of particulate solids in an aqueous liquid and generically include fluid fine tailings and mature fine tailings.

The terms fluid fine tailings and mature fine tailings are used herein consistent with the art recognized use of these terms in the oil sands industry (see, e.g., Technical Guide for Fluid Fine Tailings Management, Oil Sands Tailings Consortium, Aug. 30, 2012). Hence, fluid fine tailings (FFT) is a liquid suspension of oil sands fines in water with a solids content greater than 2 wt % but less than the solids content corresponding to the Liquid Limit. The Liquid Limit is the geotechnical water content defining the boundary between a liquid and a solid in soil mechanics, with equivalent remolded shear strength of 1 to 2 kPa. This state is defined by a standard laboratory test (ASTM D4318-10; modified for use in oil sands tailings containing bitumen). Mature fine tailings (MFT) is a fluid fine tailings with a solids content greater than or equal to about 30 wt %. Solids content is used herein to mean the mass of solids divided by mass of (solids+bitumen+water)×100%. Solids includes sand, clay, silt and other solid particles contained in oil sands tailings (does not include bitumen).

The solids of oil sands tailings are classified according to particle sizes. The term fines as used herein is consistent with the Canadian oil sands classification system and means solid particles with sizes equal to or less than 44 microns (μm). The fines in oil sands tailings are comprised mostly of silt and clay material. Oil sands deposits include a significant amount of fines, e.g., 10-30 wt %. Sand is considered solid particles with sizes greater than 44 μm. MFT typically include over 90 wt % fines as its solids content.

The terms coagulation and flocculation are often used interchangeably in the literature. As used herein, however, coagulation means particle aggregation brought about by the addition of salts, whereas flocculation means particle aggregation induced by flocculating polymers. Aggregation induced by the addition of salts is believed to be the result of destabilizing the particles suspended in the fluid by an alteration or a shielding of the surface electrical charge of the particles to reduce the inter-particle repulsive forces that prevent aggregation, whereas aggregation induced by flocculation is believed to be the result of the polymer binding to the particles thereby tying the particles together into a so called floc causing aggregation of the particles.

In practicing aspects of the present disclosure, oil sands tailings, e.g., a suspension of particulate solids in an aqueous liquid which include fines and process water, can be consolidated by treating the oil sands tailings with one or more highly water soluble salt(s) or an aqueous solution thereof to destabilize and consolidate solids in the tailings, e.g., to destabilize and consolidate fines in the tailings. In certain embodiments, the oil sands tailings is a mature fine tailings and the process includes treating MFT with the highly water soluble salt(s) or an aqueous solution thereof to form a treated tailings including a consolidated material, e.g. consolidated fines, in process water. The process water can then be separated from the consolidated material. Advantageously, the consolidated material has a solids content of at least 45% by weight, e.g., a solids content of greater than about 50% and higher than about 60%, 65%, 70% and 75% by weight.

Salts that are useful in practicing the present disclosure include salts that are highly soluble in water. A highly water soluble salt as used herein is one that has a solubility in water of greater than 2 g of salt per 100 g of water (i.e., a salt/water solubility of 2 g/100 g) at 20° C. Preferably the highly water soluble salt has a water solubility of at least about 5 g/100 g at 20° C., e.g., at least about 10 g/100 g of salt/water at 20° C.

In addition, the highly water soluble salts used in the processes of the present disclosure are preferably non-hydrolyzing. Hydrolyzing salts undergo hydrolysis when added to water to form metal hydroxides, which precipitate from the solution. Such hydrolyzing salts are believed to form open flocs with inferior solids content and cannot be readily recycled for use with additional tailings in continuous or semi-continuous processes. In addition, hydrolyzing salts typically have low solubility in water and are used at elevated temperatures to ensure sufficient solubility for aggregation, which is an energy intensive process. See U.S. Pat. No. 4,225,433 which discloses the use of lime as a coagulating agent at a temperature of 75° C.

Highly water soluble salts that are not hydrolyzing and useful in practicing processes of the present disclosure include salts having a monovalent cation, e.g., alkali halide salts such as sodium chloride, potassium chloride; also salts with monovalent cations such as sodium nitrate, potassium nitrate, sodium and potassium phosphates, sodium and potassium sulfates, etc. are useful in practicing processes of the present disclosure. Other monovalent cationic salts useful in practicing processes of the present disclosure include ammonium based salts such as ammonium acetate ($NH_4C_2H_3O_2$), ammonium chloride ($NH_4Cl$), ammonium bromide ($NH_4Br$), ammonium carbonate (($NH_4)_2CO_3$), ammonium bicarbonate ($NH_4HCO_3$), ammonium nitrate ($NH_4NO_3$), ammonium sulfate (($NH_4)_2SO_4$), ammonium hydrogen sulfate ($NH_4HSO_4$), ammonium dihydrogen phosphate ($NH_4H_2PO_4$), ammonium hydrogen phosphate (($NH_4)_2HPO_4$), ammonium phosphate (($NH_4)_3PO_4$), etc.

Ammonium based salts are useful for practicing the present disclosure since residual ammonium based salts on the consolidated material after combining the salt with the oil sands tailings are not harmful to plant life. In fact, many of the ammonium based salts are useful as fertilizers and are in fact beneficial to plant life, e.g., ammonium chloride, ammonium nitrate, ammonium sulfate, etc. Many of the monovalent sulfate and phosphate salts are also useful as fertilizers. In certain embodiments of the present disclosure, the highly water soluble salt or salts used in the processes of the present disclosure can preferably be non-toxic and beneficial to plant life to aid in environmental remediation and the restoration of mine sites.

In one aspect of the present disclosure, treating oil sands tailings with a highly water soluble salt destabilizes and consolidates solids in the tailings. Such a process can include mixing the oil sands tailings, which includes fines and process water, with a highly water soluble salt to consolidate the fines, and separating the process water from the consolidated fines to produce a high solids content, e.g., at least 45% by weight. In certain embodiments, the highly water soluble salt is an ammonium based salt.

Highly water soluble salts that can be used in practicing the present process can also include salts having multivalent cations. Such salts include, for example, divalent cation salts such as calcium and magnesium cation salts, such as calcium chloride ($CaCl_2$), calcium bromide ($CaBr_2$), calcium nitrate ($Ca(NO_3)_2$), magnesium chloride ($MgCl_2$), magnesium bromide ($MgBr_2$), magnesium nitrate ($Mg(NO_3)_2$), magnesium sulfate ($MgSO_4$); and trivalent cation salts such as aluminum and iron (III) cation salts, e.g., aluminum chloride ($AlCl_3$), aluminum nitrate ($Al(NO_3)_3$), aluminum sulfate ($Al_2(SO_4)_3$), iron (III) chloride ($FeCl_3$), iron (III) nitrate ($Fe(NO_3)_3$), iron (III) sulfate ($Fe_2(SO_4)_3$), etc. As explained above, the highly water soluble salts used in the processes of the present disclosure are preferably non-hydrolyzing. Many of the multivalent cation salts are hydrolyzing and thus less preferred for the reasons stated above. Moreover, experimentation with multivalent salts showed increased fouling of containers and formation of less cohesive consolidated materials as compared to highly water soluble salts having monovalent cations. In addition, some multivalent salts, such as $FeCl_3$ and $Fe_2(SO_4)_3$, are particularly corrosive and $Fe_2(SO_4)_3$ is formed from oxidizing pyrite and results in acid mine run-off, which make such salts less preferable for use in processes of the present disclosure.

It was counterintuitive and surprising that addition of highly water soluble salts that are not hydrolyzing, or solutions thereof, to oil sands tailings, such as MFT, would destabilize and consolidate fines in such tailings, since certain literature indicated that sodium chloride, a highly water soluble salt, is partly responsible for the stabilization of tailings. A minimum concentration of salt is required for stabilization, but once this minimum concentration has been reached, it was believed that the equivalent solids content of the tailings is virtually independent of salt concentration. See, e.g., Kotlyar et al., Clays and Clay Minerals, 1996:44: 121-131. However, we found that when a sufficiently high concentration of the highly water soluble is included in the treated tailings, the salt can destabilize and consolidate solids in the tailings. For a relatively short process times with a relatively low energy input, the salt-tailings concentration of the at least one highly water soluble salt should preferably be at least 0.5 wt % and preferably no less than about 1 wt %, such as at least about 2 wt % and even at least about 3 wt %, 4 wt %, 5 wt %, etc. The term "salt-tailings concentration" as used herein refers to the concentration of the highly water soluble salt(s) in the treated tailings and is determined by taking the percentage of the mass of highly water soluble salt(s) divided by the combined mass of the salt(s) plus the tailings and any water used to dilute the salt(s). For example, combining 1 part undiluted (i.e., neat) salt to 99 parts tailings by weight results in a salt-tailings concentration of 1 wt %. Alternatively, treating oil sands tailings with an equal weight of a 2 wt % solution of the salt also results in a salt-tailings concentration of 1 wt % in the treated tailings.

The highly water soluble salt(s) can be used to treat oil sands tailings as a solid, e.g., combining the salt as a powder with the tailings. Alternatively, the salt can be used to treat oil sands tailings as a solution, e.g., combining an aqueous salt solution with the tailings. In some aspects of the present disclosure, an aqueous solution of the highly water soluble salt can be prepared having a concentration of no less than about 1 wt %, e.g., greater than about 2 wt %, 5 wt %, 10 wt %, 20 wt %, 30 wt % and even as great as a 40 wt % or as an aqueous salt slurry. The oil sands tailings and salt solution or slurry should be mixed at a ratio sufficient to destabilize the tailings and/or cause consolidation of the solids therein. In one aspect of the present disclosure, the oil sands tailings and the salt solution are mixed at a ratio of between 5.0:1.0 and 1.0:5.0, e.g., mixed at a ratio between 1.5:1.0 to 1.0:1.5 oil sands tailings to salt solution.

After treating the oil sands tailings with at least one highly water soluble salt the solids in the tailings can be consolidated such as by mixing followed by gravity sedimentation in a settling tank or by centrifugation to increase the rate of forming a consolidated material in the treated tailings. The consolidated material can be separated from the process water by decanting, filtration, eletrofiltration, vacuuming, and/or by mechanical dewatering, i.e., applying an external force to the consolidated material.

The process of the present disclosure allows for large scale treatment of oil sands tailings in a continuous or semi-continuous process. For example, the process water separated from an initial tailings treatment can advantageously include a significant amount of the one or more highly water soluble salt(s). This separated process water, or at least a portion thereof, can then be recovered and recycled to consolidate the solids of additional oil sands tailings by mixing the recovered process water with additional oil sands tailings. The highly water soluble salt(s) in the recovered process water can be concentrated and/or additional highly water soluble salt(s) added to formulate a solution from the recovered process water for use in treating additional oil sands tailings.

Although highly water soluble salts can destabilize and consolidate solids in the tailings, it was found that the process could be significantly improved by adding one or more polymer flocculant(s) and coarse particles, e.g., particles with sizes greater than 44 such as sand, to the process. The addition of a polymer flocculant and sand to the highly water soluble salt significantly reduced the time for consolidation of fines and significantly increased the solids content. It is believed that use of coarse particles such as sand are needed to increase the solids content of the tailings to greater than about 60% without use of thermal treatments or long processing times.

Hence, in another aspect of the present disclosure, consolidating oil sands tailings includes treating the oil sands tailings with at least one highly water soluble salt, at least one polymer flocculant and coarse particles, e.g., sand, to form a treated tailings which includes a consolidated material, e.g., consolidated fines and sand, in the process water of the treated tailings. The process water can then be readily separated from the consolidated material as, for example, by one or more of decanting, filtering, gravity draining, electrofiltering, vacuuming and other evaporating techniques, etc. and/or by one or more of a device for dewatering consolidated material such as a centrifuge, decanting centrifuge, dewatering screw, hydrocyclone, vacuum belt filter, filter press or pressing devices, etc.

Polymers that are useful in practicing the present disclosure include water soluble flocculating polymers such as polyacrylamides or copolymers thereof such as anionic polyacrylamides (APAM) and cationic polyacrylamides (CPAM) containing co-monomers such as acryloxyethyltrimethyl ammonium chloride (DAC), methacryloxyethyltrimethyl ammonium chloride (DMC), dimethyldiallyammonium chloride (DMDAAC), etc. Other water soluble polymers such as polyethylene oxide and its copolymers, polymers based on modified starch and other polyelectrolytes such as polyamines and sulfonated polystyrenes can be used. The polymer flocculants can be synthesized in the form of a variety of molecular weights (MW), electric charge types and charge density to suit specific requirements.

The amount of polymer(s) used to treat tailings should preferably be sufficient to flocculate the solids in the tailings and any added sand. In some embodiments of the present disclosure, the concentration of the one or more polymer flocculant(s) in the treated tailings has a polymer-tailings concentration of no less than about 0.005 wt %, e.g., no less than about 0.01 wt %. For relatively short processing times, consolidation of the fines/sand mixture can be obtained at polymer-tailings concentrations no less than about 0.04 wt %. The term "polymer-tailings concentration" as used herein refers to the concentration of the flocculating polymer(s) in the treated tailings and is determined by taking the percentage of the mass of the polymer(s) divided by the combined mass of the polymer(s) plus the tailings and any water used to dissolve the polymer(s). For example, combining 1 part undiluted (i.e., neat) polymer to 9999 parts tailings by weight results in a polymer-tailings concentration of 0.01 wt %. Alternatively, treating oil sands tailings with an equal weight of a 0.02 wt % solution of the polymer also results in a polymer-tailings concentration of 0.01 wt %. In certain embodiments, oil sands tailings is treated with at least one polymer flocculant to yield a polymer-tailings concentration of no less than about 0.02 wt %, such as no less than about 0.03 wt %, 0.04 wt %, 0.05 wt %, and even at least about 0.07 wt %, 0.09 wt %, 0.1 wt %, 0.2 wt %, etc. The amount of polymer flocculant can be used in greater concentrations. However, after certain high concentrations it becomes difficult to dissolve the flocculant, the solution becomes too viscous and the process is less economical.

Coarse particles useful for practicing processes according to the present disclosure are preferably sand and the amount of such particles are preferably in a sand to fines ratio (S/F ratio) of less than 4:1, e.g., between about 2.5:1.0 to 0.5:1 or between about 0.75:1 and 2.25:1. The S/F ratio is calculated by determining the amount of sand added to an estimated amount of solid fines in the tailings on a weight basis. It is believed that the use of coarse particles facilitates packing of the consolidated fines which advantageously increases the solids content and can even form a jammed structure of consolidated solids, i.e. a structure in which generally individual particles of the consolidated solid can no longer move freely relative to other particles.

Treating oil sands tailings with at least one highly water soluble salt, at least one polymer flocculant and sand can be carried out in a number of ways. In certain embodiments, treating the oil sands tailings includes combining and/or mixing the various components. In addition, the at least one salt can be added directly to the tailings either as an undiluted powder or as a solution; the at least one polymer flocculant can be added directly to the tailings either as an undiluted material or as a solution, and the sand can be added to the tailings directly or with the salt and/or polymer or solutions thereof. The salt and polymer can be combined in a single solution, with or without sand, and combined with the tailings. The order of combining the salt, polymer and sand to the tailings can give equivalent results and optimization of the process will depend on the scale and equipment used in the process.

However, it tends to be more convenient to first prepare one or more solutions including the one or more highly water soluble salt(s) and the one or more polymer flocculant(s) followed by combining the one or more solutions with the oil sands tailings and sand. In certain embodiments, an aqueous solution of one or more highly water soluble salt(s) can be prepared having a concentration of no less than about 1 wt %, e.g., at least about 2 wt %, 5 wt %, 10 wt %, 20 wt %, 30 wt % and even as great as a 40 wt % or as an aqueous salt slurry for use in treating the tailings. The one or more polymer flocculant(s) can also be included in the aqueous solution of the salt(s) and can have a concentration of no less than about 0.005 wt %, e.g. no less than about 0.01 wt %, 0.04 wt %, 0.05 wt %, 0.1 wt %, 0.2 wt %, 0.4 wt %, for example. The aqueous solution of the highly water soluble salt(s) and polymer flocculant(s) can be used to treat the oil sands tailings and can be combined with such tailings at a ratio of between 5.0:1.0 and 1.0:5.0, e.g., at a ratio between 1.5:1.0 to 1.0:1.5 of oil sands tailings to aqueous solution. Sand can be combined with the tailings before, during, or after combining the tailings with the solutions.

Because highly water soluble salts and polymer flocculants that are preferably water soluble are used in the process of the present disclosure, the temperature of the treated tailings need not be elevated above ambient to practice the process. In certain embodiments, treating the oil sands tailings according to the various embodiments herein can be carried out at a temperature of no more than 50° C., e.g., no more than about 40° C. or 30° C.

In practicing aspects of the present disclosure, oil sands tailings, e.g., a suspension of particulate solids in an aqueous liquid which include fines and process water, can be consolidated by treating the oil sands tailings with at least one highly water soluble salt or aqueous solutions thereof, at least one polymer flocculant, e.g., a water soluble flocculating polymer, or aqueous solutions thereof, and sand to form a treated tailings. Treating tailings in this manner can cause destabilization and consolidation of the solids, e.g., fines and sand, in the treated tailings to form a consolidated material, which can settle under gravity relatively quickly, in the process water. The process water can then be readily separated from the consolidated material. The treated tailings and/or consolidated material can be further dewatered to further separate the process water from the consolidated material and, in some instances, further consolidate the solids. In some embodiments, the consolidated material formed in the treated tailings can be separated from the process water by any one or more of decanting, filtering, gravity draining, electrofiltering, vacuuming and other evaporating techniques, etc. and/or by any one or more of a mechanical dewatering, i.e., applying an external force to the consolidated material, with a device for dewatering consolidated material such as by applying a centrifuge, decanting centrifuge, dewatering screw, hydrocyclone, filter press, pressing device, etc.

The consolidated material formed in the treated tailings can advantageously have a high solids content, e.g., a solids content of greater than about 50% and at least about 60%, 65%, 70% and 75% by weight. In addition, the consolidated material formed in the treated tailings according to certain embodiments can result in a high solids content after mixing and/or dewatering the treated tailings in a short period, e.g., less than about 10 minutes. In embodiments of the present disclosure, the consolidated material can have a solids content of greater than about 50% and at least about 60%, 65%, 70%, 75% and 80% by weight in less than about 5 minutes, such as less than about 2 minutes and preferably less that about 1 minute after mixing and/or dewatering.

In an embodiment of the present disclosure, the process includes mixing the oil sands tailings with a highly water soluble salt, e.g., an ammonium based salt, a water soluble polymer, e.g., a polyacrylamide, and sand, e.g., in a sand to fines ratio of between 0.75:1 and 2.25:1 to form a treated tailings including a consolidated material having a high solids content, e.g., a solids content of greater than about 50% by weight, e.g., at least about 60%, 65%, 70 wt % or higher in less than 10 minutes, e.g., less than 5 minutes and even less than 2 minutes.

The process of the present disclosure allows for large scale treatment of oil sands tailings in a continuous or semi-continuous process with further recovering, recycling and purifying at least a portion of the process water in the tailings. When non-hydrolyzing, highly water soluble salts are used in the processes of the present disclosure, the process water separated from an initial treated tailings can advantageously include a significant amount of the one or more highly water soluble salt(s) initially used to treat the tailings. In certain embodiments, the separated process water includes the at least one highly water soluble salt and the process includes recovering at least a portion of the separated process water; recycling at least a portion of the recovered separated process water to treat additional oil sands tailings; and/or purifying at least a portion of the recovered process water.

Figure 3:
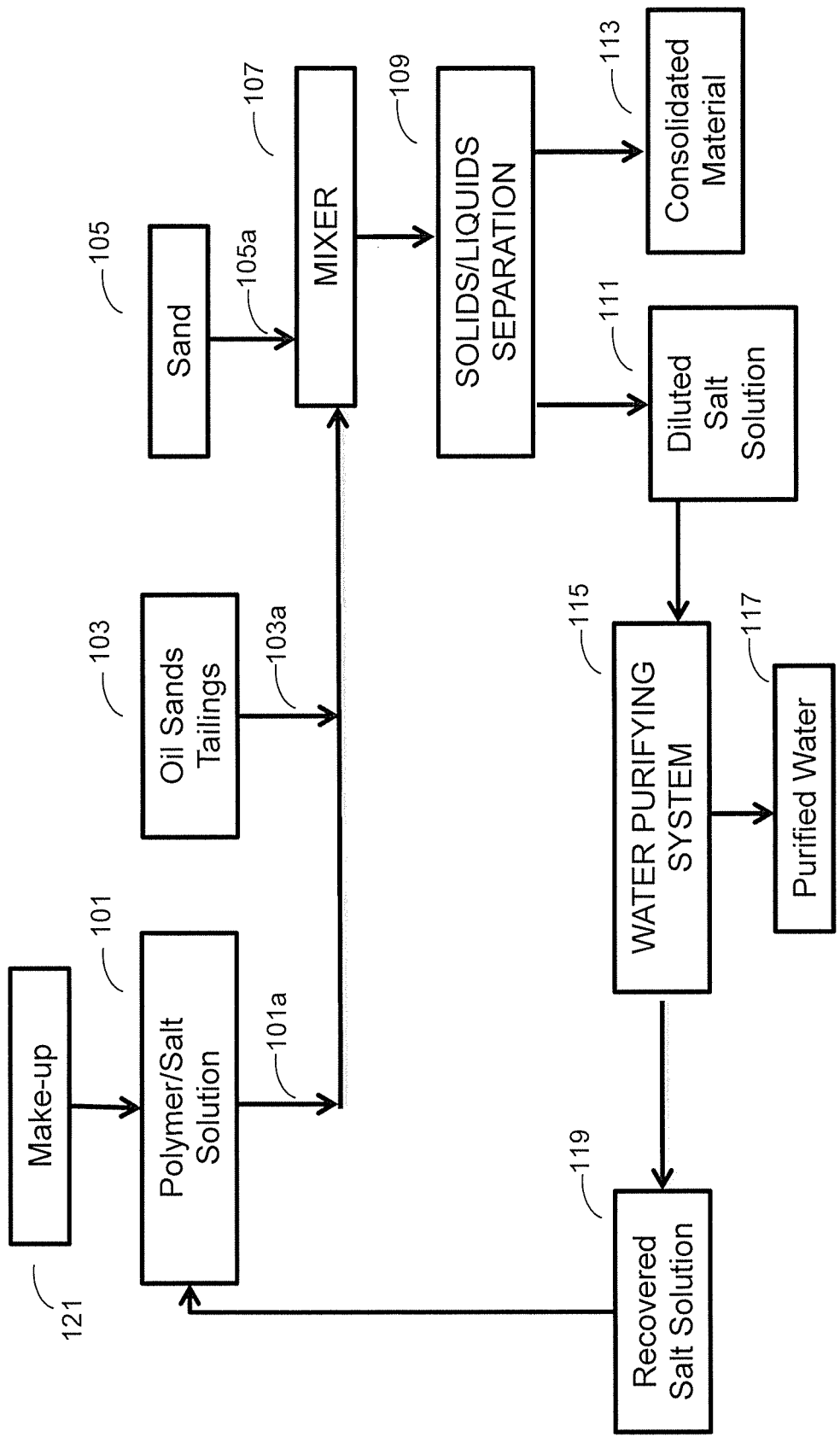
FIG. 3 schematically illustrates an exemplary embodiment of a process of consolidating, oil sands tailings.

FIG. 3 schematically illustrates such an exemplary continuous or semi-continuous process. As shown in the figure, oil sands tailings, e.g., MFT, is treated with one or more highly water soluble salt(s), one or more polymer flocculant(s) and sand by combining a stream of the salt(s) and polymer(s) in an aqueous solution (101a) with a stream of MFT (103a) and a stream of sand (105a). The solution stream of salt(s) and polymer(s) can be sourced from holding tank 101 and the streams of MFT and sand can be sourced from holding tanks 103 and 105, respectively.

For this embodiment, the solution stream of salt(s) and polymer(s) (101a) and tailings stream (103a) are carried to mixing device 107 where the stream of sand (105a) is added and the combination mixed. Mixing device 107 can be a mixing tank, ribbon mixer or other mixing device that can mix streams 101a, 103a and 105a. For this embodiment, the oil sands tailings are combined with the salt(s)/polymer(s) solution followed by addition of sand to treat the tailings. However, the order can be changed, e.g., the sand can be combined with the oil sands tailings followed by mixing with the salt(s)/polymer(s) solution. The sand can be added as a wet or dry stream. In some embodiments, the combination of the streams can cause sufficient mixing to eliminate the need for a separate mixing device and the combined streams can be carried directly to a mechanical dewatering device to separate consolidated material from process water and, in some instances, to further consolidate the solids in the consolidated material.

As shown in the embodiment of FIG. 3, after mixer 107, the treated tailings, which include a consolidated material and process water, is transferred to dewatering device 109 to separate the process water from the consolidated material. Separated process water can be recovered and collected in tank 111 and separated consolidated material can be recovered and collected in tank 113. For this embodiment, the recovered process water in tank 111 includes the process water from the tailings diluted with the solution from stream 101a and thus includes residual salt(s) from the one or more highly water soluble salt(s) and can possibly include residual polymer(s) form the one or more polymer flocculant(s) as well as contaminants from the tailings. There are also highly water soluble salts that are constituents of the original tailings and these become part of the recovered process water. The recovered process water in tank 111 is then transferred to a water purifying system 115 to purify at least a portion of the recovered process water which is transferred to tank 117. Water purifying systems that can be used for embodiments of the processes of the present disclosure include reverse osmosis systems, vacuum distillation systems, electrodialysis, filtration systems, etc. The remaining, non-purified recovered process water is transferred to tank 119 to recover process water including the one or more highly water soluble salt(s) and highly water soluble salts that are constituents of the original tailings. This remaining, non-purified recovered process water can be recycled back to holding tank 101 and deficiency in the concentration of the salt(s) or polymer(s) in holding tank 101 can be corrected by adding additional highly water soluble salt(s) or polymer flocculant(s) from one or more make-up tanks such as make-up tank 121.

The process of the present disclosure can also include steps to recover residual bitumen from the oil, sands tailings. As explained earlier, oil sands tailings typically include a low amount of residual bitumen, e.g., MFT include about 1 to 2 wt % residual bitumen. The process of the present disclosure can include adding an organic solvent (e.g., naphtha, kerosene or a $C_{5-8}$ hydrocarbon, such as pentane, hexane, heptane, benzene, toluene, etc. or mixtures thereof) to dilute residual bitumen and form an organic mixture and removing the organic mixture, for example.

In addition, the consolidated solids can be recovered. The recovered consolidated solids can include residual highly water soluble salt(s) from the treatment of the tailings. When the salt used in treating the tailings is beneficial to plant life, such as an ammonium based salt or sulfate based salt or phosphate based salt, the residual salt can act as a fertilizer with the consolidated solids.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Treatment of Tailings with Highly Water Soluble Salt.

Figure 4:
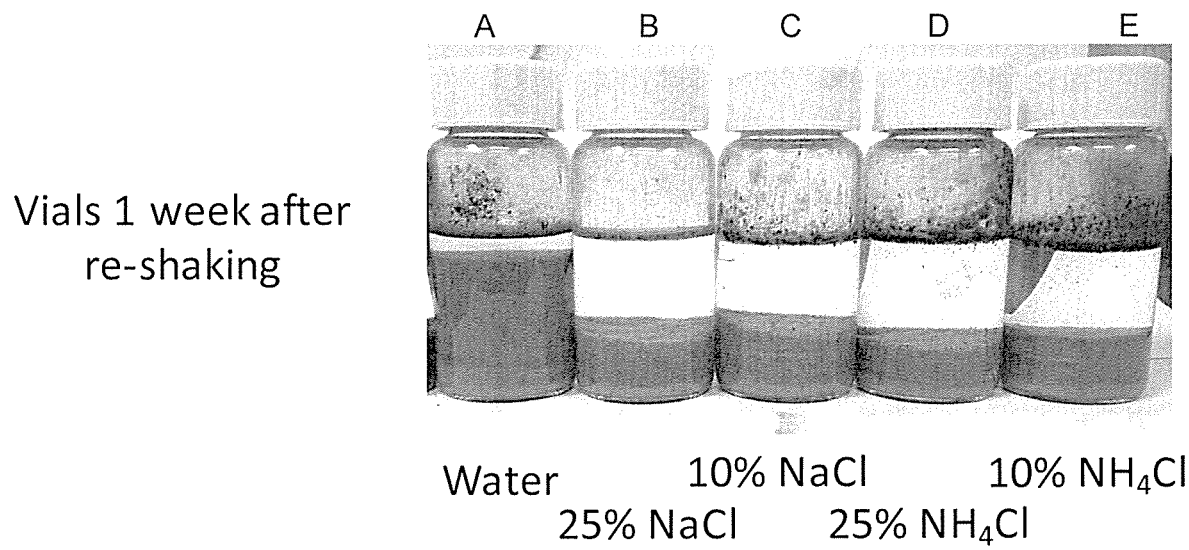
FIG. 4 is a picture of vials containing mature fine tailings treated in various ways one week after re-shaking and showing that treated MFT were destabilized by processes according to embodiments of the present disclosure.

For this set of experiments, five vials of MFT were prepared, i.e., vials labeled A, B, C, D, and E, shown in FIG. 4. Each of the five vials included approximately 5 grams of MFT. The MFT were obtained from Alberta Innovates Corp., which obtained the samples from oil sands tailings ponds. The MFT had a sludge-like consistency with an average solids content of about 30 wt %.

Water was added to vial A in an equal weight of the MFT, which was used as a control for this experiment. The MFT in vials B and C were treated by adding an equal weight of a sodium chloride (NaCl) solution to MFT, e.g. vials B and C each contain a 1.0:1.0 ratio of NaCl salt solution to MFT, by weight. For vial B, a 25 wt % NaCl solution was used and for vial C, a 10 wt % NaCl salt solution was used as the salt solution. Thus the salt-tailings concentration for vial B was 12.5 wt % and for vial C was 5 wt %. An equal weight of an ammonium chloride ($NH_4C_1$) solution to MFT was added to vials D and E. For vial D, a 25 wt % $NH_4Cl$ solution was used and for vial E, a 10 wt % $NH_4Cl$ solution was used as the ammonium chloride salt solution. Thus the salt-tailings concentration for vial D was 12.5 wt % and for vial E was 5 wt %.

The materials in the vials were then mixed by shaking and were then centrifuged. The vials were centrifuged at 3000 rpm for 30 minutes on a centrifuge. After centrifugation, the vials were re-shaken. The purpose of re-shaking the samples was to provide an equal starting point for all of the samples for comparisons. The samples were then allowed to stand and separate under gravity. It should be noted that in practicing certain aspects of the process of the present disclosure, the samples would be mixed and, optionally, centrifuged but not re-shaken.

The appearance of vial A after standing for 10 minutes showed a small degree of settling, which indicating that dilution with water alone is useful but does not significantly cause consolidation of the solids. The vials containing salt solutions (Vials B, C, D, and E) showed an enhanced rate of settling, however, with the 10% $NH_4Cl$ solution showing visible signs of forming a clear supernatant. After 1 hour, the vials containing $NH_4Cl$ solutions (vials D, E) were almost clear, while the vials with added NaCl solutions (vials B, C) were also starting to clarify as the mineral fines settled. In contrast, the control vial containing just added water remained murky with just a small degree of settling.

In order to demonstrate that the settled mineral fines were also consolidated, the vials were vigorously re-shaken and again allowed to stand. The salt containing vials quickly settled, while the water control vial only had a small degree of settling and consolidation. This is more clearly seen in a picture of the vials taken one week later, shown in FIG. 4. The water control vial A contains some settled material and a large volume of an unsettled and unconsolidated material. There is a relatively small volume of what appears to be clear water at the top. (The clear water probably contains some dissolved salts from the MFT itself). The vials that were treated with added highly water soluble salts clearly showed just two phases, however. A consolidated, settled sediment of fines at the bottom of the vials with a clear water solution of salts present as a supernatant can be seen.

The supernatant liquid above the consolidated solids in the vials with, added salt solutions, together with water that remains dispersed between the mineral fine particles in the consolidated material, can be removed by decanting, centrifugation or other methods known in the art.

Treatment of Tailings with Highly Water Soluble Salt and/or Water Soluble Polymer.

For this set of experiment, four vials of MFT were prepared and treated, i.e., vials labeled A2, B2, C2, and D2. Each of the four vials included approximately 5 grams of MFT. The MFT were obtained from Alberta Innovates Corp., which obtained the samples from oil sands tailings ponds. The MFT had a sludge-like consistency with an average solids content of about 30 wt %.

Each vial contained 50% MFT by weight and 50% by weight of an added solution. The solution added to vial A2 included 10% ammonium chloride and 0.1% of polyacrylamide in water; the solution added to vial B2 included 10% ammonium chloride and 0.1% of a cationic polyacrylamide in water; the solution added to vial C2 included 0.1% of polyacrylamide without salt; and the solution added to vial D2 included 0.1% of a cationic polyacrylamide without salt.

After adding an equal weight of each of the solutions to MFT, the vials A2 through D2 were centrifuged at 3000 rpm for 1 min on a LW Scientific laboratory centrifuge. After the vials were centrifuged, it was observed that the addition of polymer alone was not effective under the experimental conditions to cause significant consolidation of the fines in the MFT.

To provide a more quantitative measure of sedimentation rate and extent of compaction, centrifugation tests using various polymers were conducted in calibrated centrifuge tubes. Six samples were prepared by combining 5 ml of MFT and 5 ml of a solutions to each tube labeled A3, B3, C3, D3, E3 and F3 such that each tube contained 10 ml of the combined MFT and solution. The first tube (A3) had just 5 ml of water added to the 5 ml of MFT and was used as a control tube. The second tube (B3) had just 5 ml of a 10% ammonium chloride (AC) solution added to 5 ml of MFT. The remaining four tubes (C3, D3, E3, F3) were prepared by adding 5 ml of a solution including 10% ammonium chloride with 0.1 wt % of either a polyacrylamide (PAM) (C3), a polyacrylamide copolymer (cationic PAM1) (D3), an anionic polyacrylamide (anionic PAM) (E3), or a cationic polyacrylamide (cationic PAM2) (F3), respectively.

Figure 5:
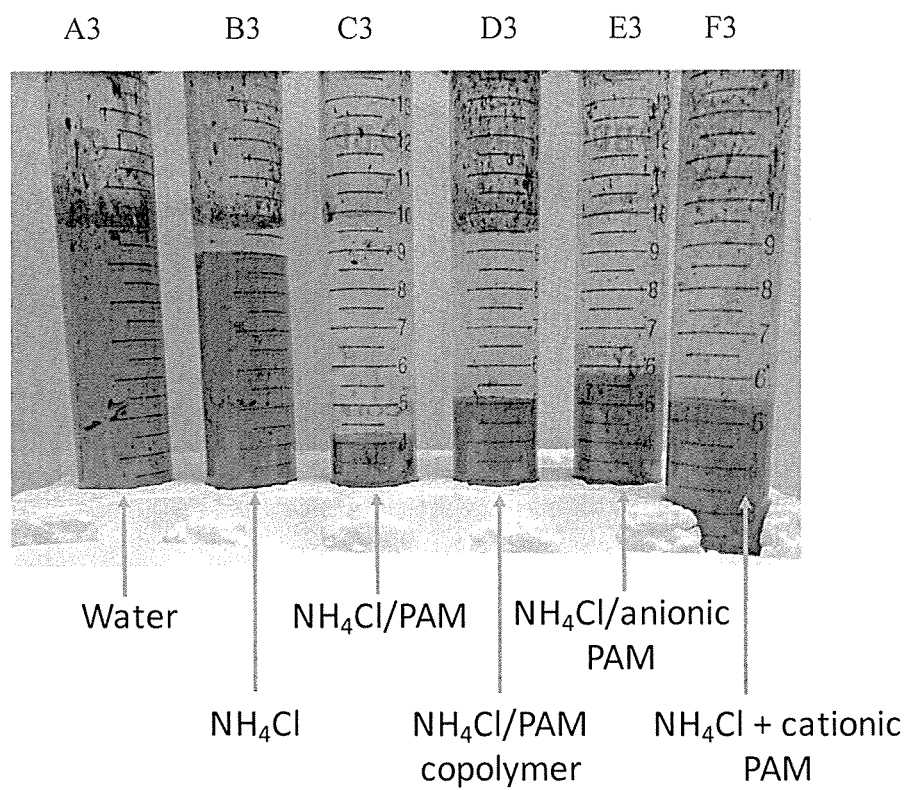
FIG. 5 is a picture of calibrated centrifuge tubes containing mature fine tailings treated in various ways and centrifuged at 3000 rpm for 30 seconds.

The tubes were then centrifuged at 3000 rpm, initially for 10 seconds. (Note that it took about 20 seconds to reach this speed and approximately another 20 seconds to come to a halt after turning the motor off). As seen in the results of FIG. 5, which show the tubes after centrifuging at 3000 rpm for 30 seconds, the addition of polymers to the systems clearly sped-up consolidation of the solids by aggregating and flocculating particles to give a larger effective mass. Tube C3 clearly gave the best result.

Figure 6:
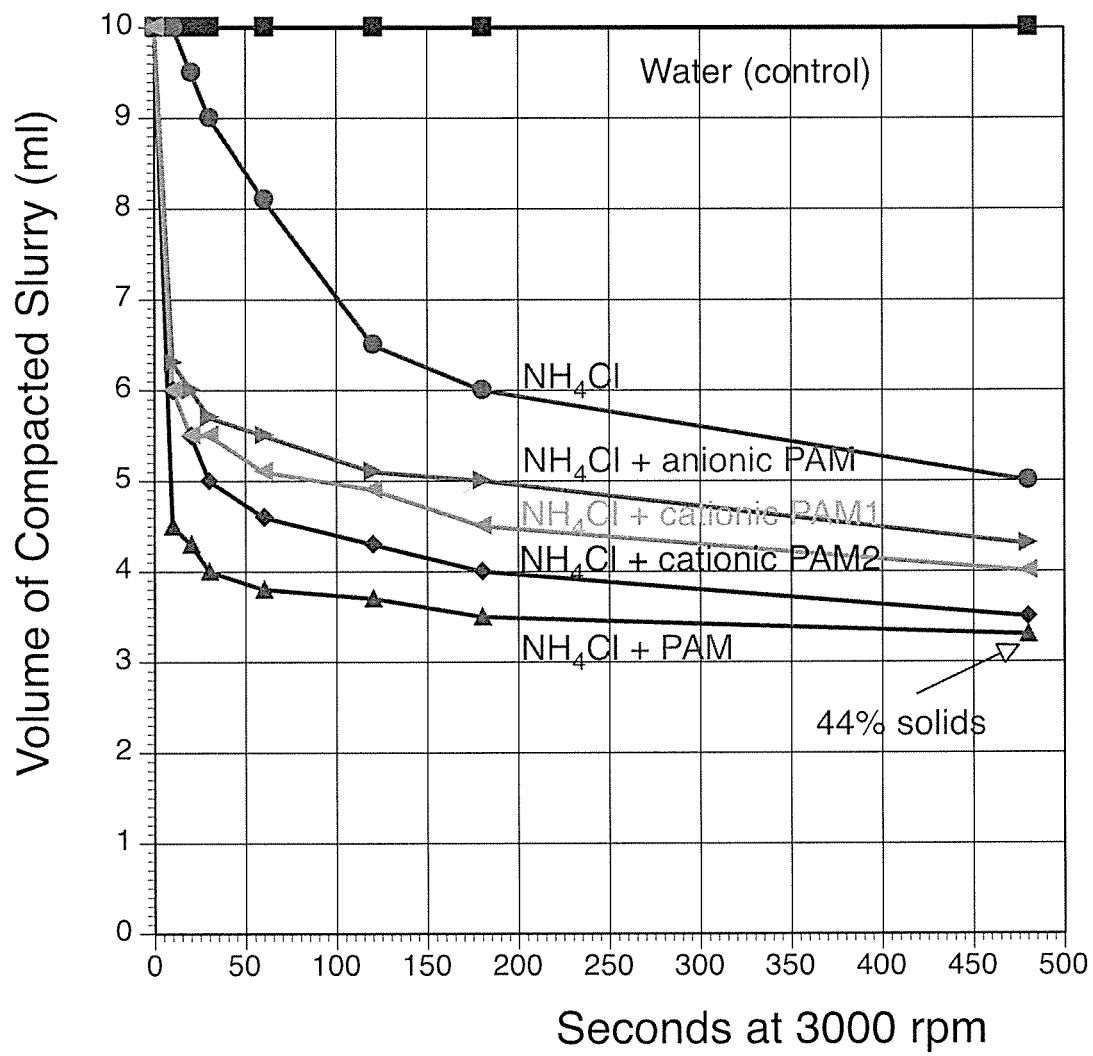
FIG. 6 is a plot of volume of compacted slurry versus centrifugation time of various MFT samples treated with water, salt, or various solutions of salt and polymer.

Centrifugation at 3000 rpm was continued for additional periods of time and the volume of compacted slurry vs. centrifugation time is plotted in FIG. 6.

As demonstrated by the data in FIG. 6, the water control showed no compaction, even after centrifuging at 3000 rpm for close to 500 seconds. The ammonium chloride alone, with no polymer additive, showed a much slower compaction rate than those that also used polymer. Apart from the tube containing water, all slurries showed an initial (relatively) fast rate of sedimentation. Addition of polymer PAM at a concentration of 0.1 wt % resulted in a very fast compaction of the MFT, with a partly consolidated mass forming in the first 10 seconds (at 3000 rpm). After the initial fast rate of sedimentation, the rate of compaction slowed significantly and the improved rate of compaction did little to affect the solids content obtained after centrifuging 8 min.

Solid contents of the samples were determined from the volume of the compacted slurry and the known weight of fines in the MFT. For tube C3, containing polymer PAM, the solids content was calculated to be about 44%. This value was checked by drying the slurry from tube C3. That is, the consolidated material in the form of a slurry for tube C3 was separated from the supernatant liquid by decanting the liquid. The separated slurry was then removed from the tube and the wet mass weighed followed by drying and reweighing the dried mass to determine the solids content. Drying the sample of C3 gave a dried solids content of about 46%.

Both estimates of the solid contents, volume measurement and weight measurement, are subject to some measurement error. For example, the calculated values based on volume can have measurement error due to some difficulty in accurately measuring the slurry/liquid boundary in the tube and assumptions concerning the specific gravity of the minerals, while the weighing experiments can have measurement error due to carried-over free water near the surface of the slurry when separating the supernatant liquid from the slurry. Nevertheless, these numbers are consistent and show the relative trend and relative performance of the various treatments of the MFT.

Treatment of Tailings with Highly Water Soluble Salt, Water Soluble Polymer and Coarse Particles.

Figure 7:
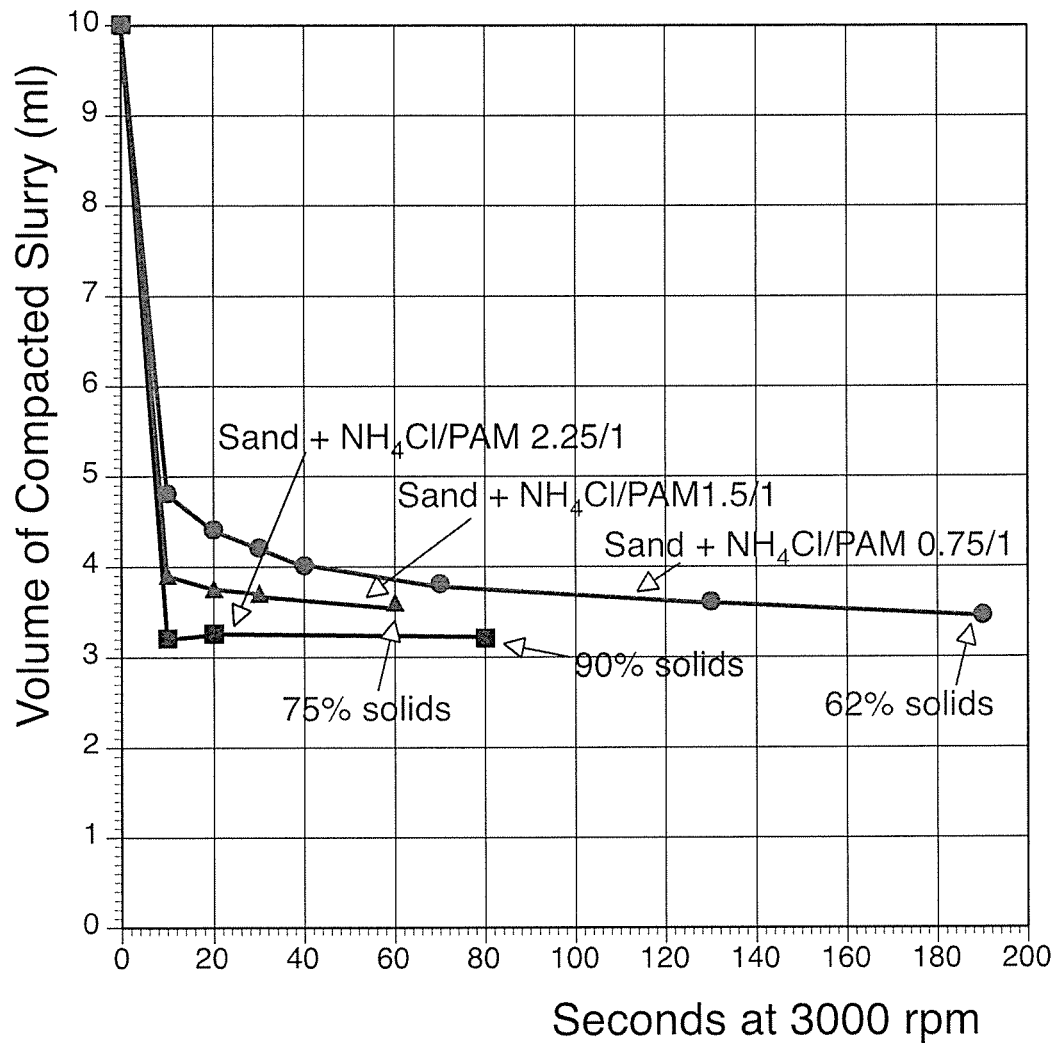
FIG. 7 is a plot of volume of compacted slurry versus centrifugation time of various MFT samples treated with a salt, a polymer and various ratios of sand to fines.

Vial tests were performed using 5 ml of MFT to which was added 5 ml of a solution of 10 wt % of ammonium chloride and 0.1 wt % of PAM. Sand was then added to this mixture. Three different ratios of sand to fines (S/F), 0.75/1, 1.5/1, 2.25/1, respectively, were used for each vial. The results after centrifuging for various periods of time are summarized in FIG. 7.

Care was taken to avoid segregation of the fines and sand, as there is some immediate flocculation of the particles as MFT and NH$_4$Cl/PAM solution are mixed. However, the initial flocs appear to be open structures (low solids content) and good mixing of the sand and the initial flocs occurred as the polymer acts to tie coarse and fine particles together, both limiting segregation and speeding up compaction.

Treating MFT with the salt, polymer and sand quickly gave a consolidated material with the consistency of a wet solid. The calculated final solids contents were about 62%, about 75% and about 90% for S/F ratios of 0.75/1, 1.5/1 and 2.25/1, respectively. All sand/fines ratios are significantly less than 4:1 S/F ratio. For the 1.5/1 S/F sample, the solids content determined by drying was about 73%.

In addition, all three solids appeared to have formed a "jammed" structure. They all had a degree of mechanical integrity and had to be scraped out of the tubes with some difficulty, unlike the paste-like slurries obtained with the use of ammonium chloride and/or polymer alone.

Figure 8:
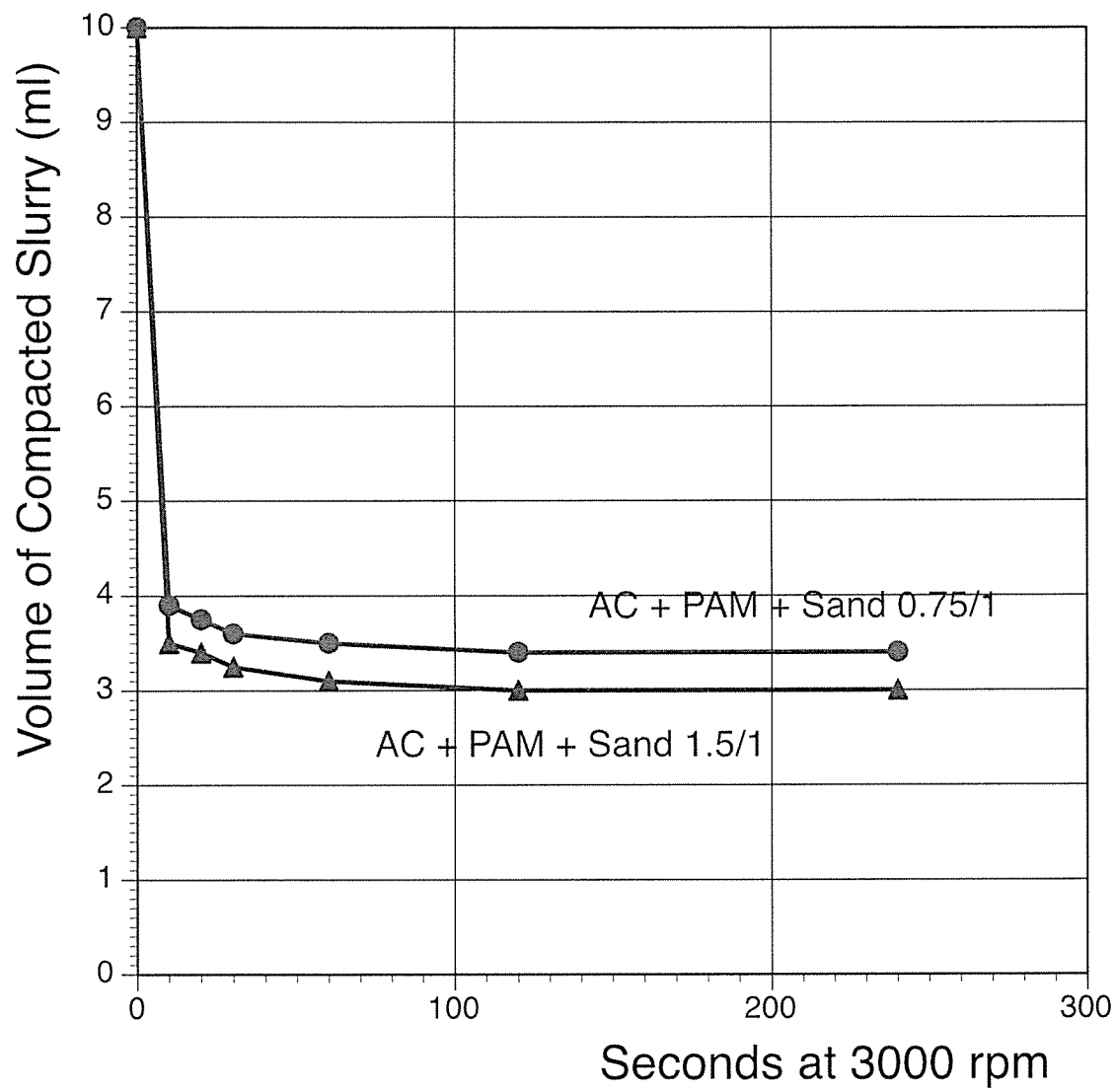
FIG. 8 is another plot of volume of compacted slurry versus centrifugation time of various MFT samples treated with salt, polymer and sand.
Figure 9:
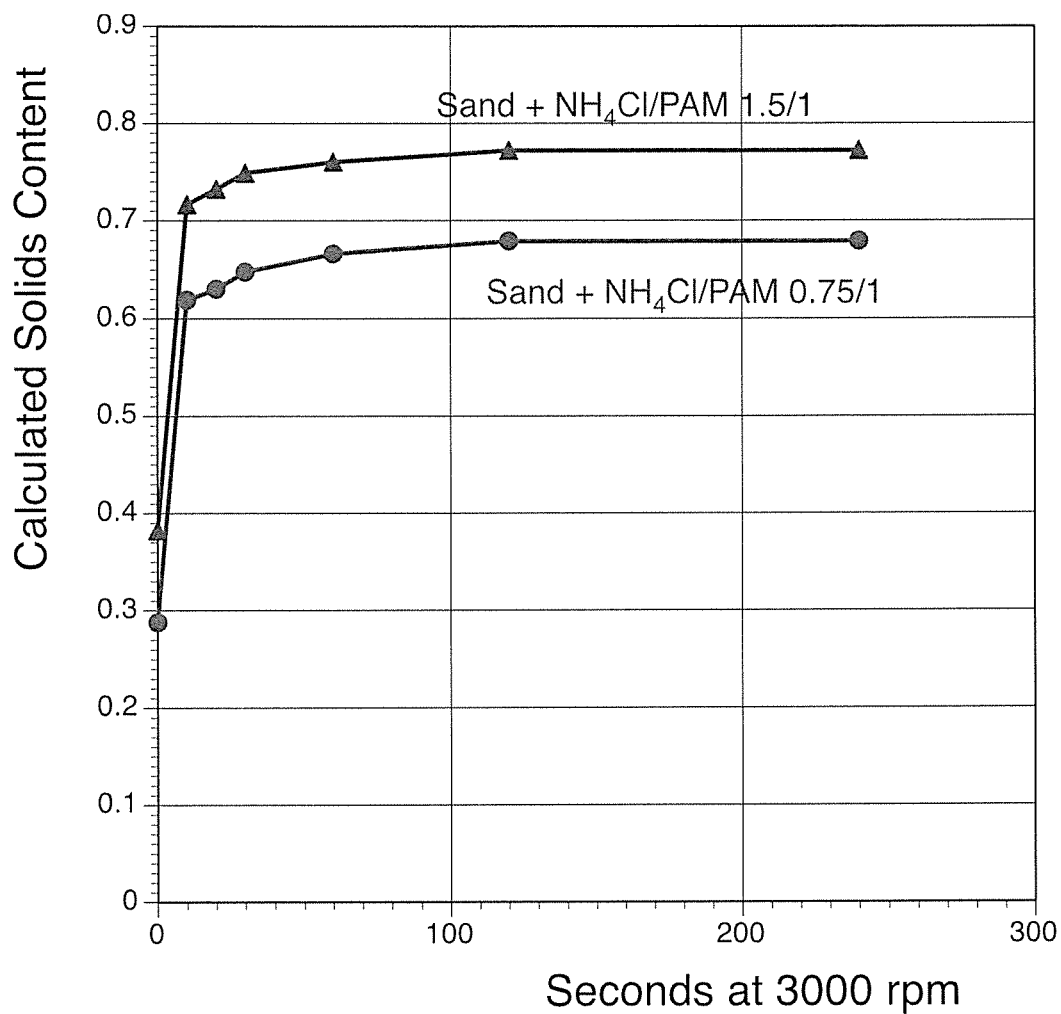
FIG. 9 is a plot of calculated solids content versus time for the two treated MFT samples provided in FIG. 8.

The experiments with the two lowest S/F ratios were repeated. FIG. 8 shows the slurry volume observed after centrifuging for various periods of time. The results are slightly different to those reported in FIG. 7 (possibly as a result of jamming or measurement errors), but slurry volumes were again consistently reduced to 3.5 ml or less within 30 sec. The calculated solids contents are shown in FIG. 9. For an S/F ratio of 1.5/1, the solids content was calculated to be about 75%, while for a S/F ratio of 0.75/1, the solids content was calculated to be about 68%. After further centrifugation, the solids content of the consolidated material determined by drying were about 74% and about 67%, respectively.

Varying Salt and Salt Concentration

Additional experiments were carried out with various highly water soluble salts and in different concentrations and with and without sand to treat oil sands tailings. A series of salt/polymer solutions were prepared. All of the salt/polymer solutions included 0.1 wt % of polyacrylamide (PAM) but varied the type and concentration of the salt. For example, a series of 10 wt %, 5 wt % and 2 wt % calcium chloride solutions each with 0.1 wt % of PAM were prepared and used to treat MFT. Other 10 wt %, 5 wt % and 2 wt % salt solutions of ammonium sulfate, potassium chloride, etc. were prepared each with 0.1 wt % of PAM. An equal weight of a particular salt/polymer solution was then combined with MFT, with or without sand, in a vial followed by vigorous mixing. The vials were then centrifuged at 3000 rpm on a LW Scientific laboratory centrifuge for 30 seconds to form a consolidated material in the form of a slurry. After centrifugation, the supernatant liquid was separated from the consolidated material by a pipette. The consolidated material was then weighed, dried and reweighed to determine a solids content of the consolidated material. The various salts and their concentrations which were used to treat MFT and the resultant solids content data are summarized in Tables 1 and 2 below.

TABLE 1

Solids content of MFT treated with an equal weight of a salt/PAM solution without the addition of sand and after centrifugation.

| Salt (+0.1 wt % PAM) No Sand | 10% Concentration[1] | 5% Concentration[2] | 2% Concentration[3] |
|---|---|---|---|
| Ferric Chloride (FeCl$_3$) | 34.9% | — | 35.6% |
| Aluminum Sulfate (Al$_2$(SO$_4$)$_3$) | 33.1% | — | 34.1% |
| Calcium Chloride (CaCl$_2$) | 36.8% | 37.1% | 35.8% |
| Ammonium Sulfate (NH$_4$SO$_4$) | 33.1% | 31.8% | 31.4% |
| Potassium Chloride (KCl) | 35.4% | 32.4% | 33.5% |

TABLE 2

Solids content of MFT treated with an equal weight
of a salt/PAM solution with the addition of sand
(S/F ratio 1:1) after centrifugation.

| Salt (+0.1 wt % PAM) With Sand | 10% Concentration[1] | 5% Concentration[2] | 2% Concentration[3] |
|---|---|---|---|
| Ferric Chloride (FeCl$_3$) | 45.7% | — | 52.8% |
| Aluminum Sulfate (Al$_2$(SO$_4$)$_3$) | 51.4% | — | 53.7% |
| Calcium Chloride (CaCl$_2$) | 58% | 56.8% | 56.1% |
| Ammonium Sulfate (NH$_4$SO$_4$) | 53.6% | 52.3% | 53.5% |
| Potassium Chloride (KCl) | 53.4% | 52.5% | 53.9% |

[1]The salt-tailings concentration was about 5 wt %.
[2]The salt-tailings concentration was about 2.5 wt %.
[3]The salt-tailings concentration was about 1 wt %.

Table 1 reports the solids content of dried consolidated material following treating of MFT with the various salt/polymer solutions without sand. After centrifugation for just 30 seconds, the highly water soluble salts gave solids contents for the consolidated materials in a range between about 31%-37%. However, the use of highly water soluble salts having a multivalent cation such as the aluminum and ferric cations appeared to cause fouling of the vial walls and gave a less cohesive consolidated material as compared to highly water soluble salts having a monovalent cation under the tested conditions. In some tests using salt concentrations of 10%, the clarified water sitting on top of the consolidated materials were removed using a pipette and the wet solids pressed between paper towels. It was found that the salts with multivalent cations, aluminum chloride (AlCl$_3$), ferric chloride (FeCl$_3$) and calcium chloride (CaCl$_2$), which all gave significant deposits of a slimy material on the vial walls, were less cohesive than the pressed solids obtained using salts with monovalent cations, such as the ammonium salts NH$_4$Cl and (NH$_4$)$_2$SO$_4$.

Table 2 reports the solids content of dried consolidated material following treating MFT with the various salt/polymer solutions and sand. Sand was added with a 1:1 sand to fines ratio (i.e., 1.5 g of sand was added to the 5 gm of MFT having 30% solids to give a 1:1 ratio of the weight of sand to that of the solids in the MFT). After centrifugation for just 30 seconds, the highly water soluble salts gave solids contents for the consolidated materials in a range between about 46%-58%, which was significantly higher than the range of solids contents without use of sand. Although the solids content of the vials containing added sand is twice those without sand, the volume of the centrifuged slurry is about the same.

The data in Tables 1 and 2 show that addition of 2 wt % salt solution to treat MFT was as effective as a 10 wt % salt solution. That is, a 1 wt % salt-tailings concentration was as effective as a 5 wt % salt-tailings concentration. Since an equal weight of the salt/polymer solution was used to treat MFT, the salt concentration of the added salt in the treated tailings is one-half of the concentration in the salt/polymer solution, i.e., the added 2 wt % salt solution provided a 1 wt % salt-tailings concentration and the 10 wt % salt solution provided a 5 wt % salt-tailings concentration. The salt-tailings concentration in treated MFT can be achieved in a number of ways. For ease of handling in the foregoing vial tests, it was convenient to combine equal weights of salt/polymer solutions to MFT. However, smaller amounts of salt/polymer solutions with higher concentrations thereof to give the same salt-tailings concentration give equivalent results of consolidated materials.

Centrifuging in flat-bottomed vials is not as effective in terms of producing a high solids material as using centrifuge tubes. It should be kept in mind that for all sets of laboratory vial and tube tests, there is always solution remaining in the voids between the particles. It will be shown later that the solids content of the consolidated material can easily be increased from the 46%-58% range by simply draining or the use of mechanical dewatering methods known to the art, such as filter presses, belt filters, dewatering sand screws, decanting centrifuges, hydrocyclones, etc.

Varying Salt Concentration and Polymer Concentration

Figure 10:
FIG. 10 shows pictures of vials containing mature fine tailings treated with an ammonium salt solution including a'polyacrylamide flocculant at the concentrations indicated in the figure.
Figure 10:

When salt, polymer and sand are used together, salt-tailings concentrations in excess of 0.5 wt % and preferably no less than about 1% should be used to achieve reasonably fast consolidation of the solids in the tailings. In addition, although a degree of consolidation of the fines/sand mixture is obtained at polymer-tailings concentrations as low as 0.01 wt % for relatively short processing times, superior results are obtained at polymer-tailings concentrations of 0.05% and higher. These preferences were determined by a set of vial experiments, the results of which are illustrated in FIG. 10. The top set of vials shows results obtained by adding 5 g of a 2 wt % ammonium sulfate ((NH$_4$)$_2$SO$_4$) solution containing PAM to 5 g of MFT. Sand was also added to give a sand-to-fines ratio of 1:1 (i.e., 1.5 g of sand was added). The amount of PAM in the solutions was varied between 0.1% (by weight) and 0.02% (by weight). The bottom set of vials show what is observed when a 1 wt % of the ammonium sulfate was used. The vials were centrifuged at 3000 rpm for 30 seconds to accelerate settling.

It can be seen that for all the vials treated with the 1 wt % (NH$_4$)$_2$SO$_4$ solutions, there is a degree of settling of the fines and sand, but the supernatant liquid contains a significant amount of suspended particles. In addition, visually there appears to be a degree of segregation of the sand and fines. In contrast, the MFT treated with a 2 wt % (NH$_4$)$_2$SO$_4$ solution containing 0.1 wt % PAM showed settled and compacted solids in contact with a clear supernatant. As the amount of polymer in the solution is reduced from vial A4 to E4, the clarity of the supernatant decreases, as more suspended particles remain in the liquid phase. Greater clarity of the supernatant liquid should be achievable at longer centrifuge times, but for short processing times, treating MFT to result in a salt-tailings concentration of no less than about 0.5 wt % and a polymer-tailings concentration of no less than about 0.04 wt % are preferable.

The solids contents of the consolidated materials in each of the vials shown in FIG. 10 was determined by drying, i.e., the centrifuged consolidated material was separated from its supernatant liquid, the wet mass weighed, dried and reweighed to determine a solids content. The solids content of the consolidated materials for the sets of vials shown in FIG. 10 are summarized in Table 3.

TABLE 3

The solids content of centrifuged ammonium sulfate/PAM treated MFT as determined by separating and drying consolidated material.

|  | 0.1% PAM % Solids | 0.08% PAM % Solids | 0.06% PAM % Solids | 0.04% PAM % Solids | 0.02% PAM % Solids |
|---|---|---|---|---|---|
| 2% $(NH_4)_2SO_4$ | 60.3% | 58.8% | 58.1% | 52.0% | 48.5% |
| 1% $(NH_4)_2SO_4$ | 54.4% | 57.2% | 58.1% | 56.3% | 44.6% |

It can be seen that for the 2 wt % $(NH_4)_2SO_4$ solution containing 0.1 wt % PAM, a solids content of just over 60% was achieved. This decreased only slightly when treating MFT with solutions including PAM concentrations of 0.08 wt % and 0.06 wt %, but significantly at lower PAM concentrated solutions. Treating MFT with an equal weight of the $(NH_4)_2SO_4$/polymer solutions resulted in a salt-tailings concentration of about 1 wt % for each of vials A4-E4, and for vial A4, a polymer-tailings concentration of about 0.05 wt % PAM, for vial B4 a polymer-tailings concentration of about 0.04 wt % PAM, for vial C4 a polymer-tailings concentration of about 0.03 wt % PAM, for vial D4 a polymer-tailings concentration of about 0.02 wt % PAM, and for vial E4 a polymer-tailings concentration of about 0.01% PAM. For the 1 wt % $(NH_4)_2SO_4$ solutions, the solids content was very variable, reflecting the problems with segregation of coarse and fine particles in the consolidated materials in these experiments.

Varying Order of Addition and Concentration

The salt-tailings concentration and polymer-tailings concentrations in treated MFT can be achieved in a number of ways. Further, the order of combining the highly water soluble salt, water soluble flocculating polymer and coarse particles to the tailings can give equivalent results. This was shown by preparing a series of vials with MFT and treating the MFT by differing the order of salt (ammonium sulfate), polymer (PAM added as a 1 wt % stock solution to the MFT to give a final polymer-tailings concentration of 0.1 wt %) and sand and also by adding the salt either as: (i) a 2 wt % solution, (ii) a solution including 2 wt % of the salt and 1 wt % of PAM, or (iii) an undiluted, dry powder. After treating the MFT with salt, polymer and sand in differing orders and differing concentrations of salt, the treated MFT in the vials were mixed and then centrifuged for 30 seconds at 3000 rpm. All of the so treated MFT gave solids contents in a range of 58 wt % to 62 wt %.

Insoluble Salts

Unlike highly water soluble salts, salts such as gypsum ($CaSO_4.2H_2O$) and lime (CaO) that are used to coagulate wastewater have a very low water solubility (less than 0.3 g/100 g at 20° C.) and work by a sweep coagulation mechanism. Largely insoluble salts such as gypsum and lime have also been used in treating wastewater and in attempts to dewater MFT. These largely insoluble salts are ineffective in the process of the present disclosure since they produce a segregated slurry with poor cohesion. For example, if lime and water are mixed, the (hydrolyzed) lime remains largely insoluble. The amount of lime was 10% of the total (lime+water). If this 10% suspension with 0.1% PAM is added to MFT, with or without sand, a clearly segregated centrifuged material (3000 rpm, 30 sec) is obtained, as evident by the layers of solids that can be seen in the vials.

Large Scale Testing.

In initial large-scale work, about 100 lbs (approximately 45.4 kg) of MFT was treated with an equal weight of a 10% solution of ammonium chloride that included 0.1% PAM. These components were mixed together in a drum and a loose floc of fines was formed. About 30 lbs (approximately 13.6 kg) of sand was then added, the amount of sand being equal to the calculated weight of fines present in the MFT (i.e., sand-to-fines solids ratio of 1/1). After mixing, the resulting consolidated sand/fines material has sufficient integrity that it could be collected with a paddle and a ball could be formed by pressing the consolidated material by hand. Drying a sample of the consolidated material established that it had a solids content of 48.5%.

In addition, the consolidated material was suspended in what appeared to be clear liquid. Rather than attempting to centrifuge this material, a paper towel test was conducted. A ball of the consolidated slurry-like material was pressed a few times between paper towels. The towels were not fouled by fines. The final pressed disk had a solids content of 74.5% and was cohesive. This shows that a high solids content material can be obtained using far less sand (1:1 S/F ratio) than presently used (4:1 S/F ratio) in composite tailings technologies.

In an additional large scale test, about 100 lbs (approximately 45.4 kg) of MFT was mixed with a 10% solution of ammonium chloride containing 0.1% PAM in a large ribbon mixer. About 24 lbs (approximately 10.9 kg) of sand was then added, the proportion of sand to MFT solids in this run was somewhat less than in the work described above, a S/F ratio of about 0.8:1. Mixing continued for a few minutes. The resulting consolidated slurry-like material clearly had two phases, a semi-solid like material in an apparently clear liquid. The consolidated solids and liquid was then poured out of the bottom of the mixer and the solids were captured on a metal sieve and the liquid quickly drained into a drum placed beneath.

Figure 11:
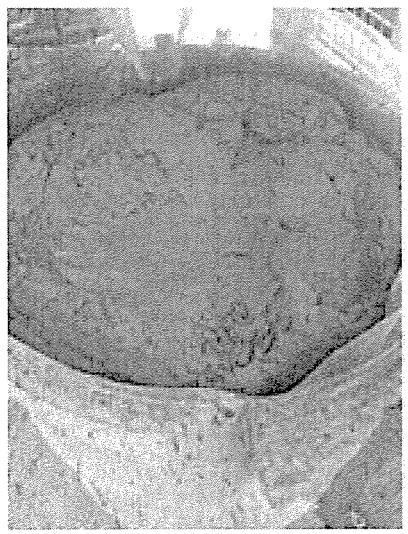
FIGS. 11A and 11B are pictures of consolidated solids produced according to a process of the present disclosure.
Figure 11:

A sample of the collected consolidated material was taken and dried in an oven overnight to determine its solids content. The solids content of the initially gravity-drained consolidated material which included fines and sand was determined to be 53%. Another sample of the collected consolidated material was pressed by hand between paper towels. See FIG. 11B. The solids content of this sample was 70%. The remaining collected consolidated material was allowed to drain overnight. FIG. 11A shows consolidated solids collected and draining. The solids content of the consolidated material that was allowed to drain overnight increased to 68% from the initially collected sample of 53%. After standing for a week, the solids content of the remaining collected consolidated material increased to 75%. Upon standing for an additional week, the drained material achieved a crumbly, relatively dry solid material form. This shows that a high solids content composite material can be formed according to embodiments of the present disclosure by simply mixing tailings with a highly water soluble salt, polymer flocculant and sand followed by gravity drainage.

The data of present disclosure show that oil sands tailings can be treated with a highly water soluble salt to consolidate the fines therein and also with such a salt in combination with a polymer flocculant and coarse particles, e.g., sand, to consolidate fines in oil sands tailings. Superior compaction rates and solids contents were provided by treating the oil sands tailings with the combination of at least one highly water soluble salt, at least one polymer flocculant and sand.

Further, the data indicates that use of a S/F ratio of 1.5/1 provided a solids content in excess of 70%, which solids appear to have the mechanical properties necessary to form a trafficable surface, in a relatively short period of processing time. In addition, centrifugation in a small lab centrifuge (calculated to be approximately 1000 g centrifugal force) results in a fast compaction of the slurry, about 20-40 seconds centrifugation time for slurries with an S/F ratio greater than about 1.5. Larger centrifuges having larger g forces (i.e., in a decanter centrifuge) should improve the rate and consolidation of fines.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A process of consolidating oil sands tailings which include greater than 2 wt % of fines in process water, the process comprising:
    treating the oil sands tailings, which result from extraction of bitumen from oil sands, with at least one highly water soluble salt, at least one polymer flocculant and sand to form a treated tailings including a consolidated material including fines from the process water; and
    separating the process water from the consolidated material, which includes the at least one highly water soluble salt dissolved therein,
    wherein the treated tailings has a salt-tailings concentration of the at least one highly water soluble salt of at least 0.5 wt %, and
    wherein the at least one highly water soluble salt is an alkali halide salt.

2. The process of claim 1, wherein the oil sands tailings is mature fine tailings.

3. The process of claim 1, wherein the at least one highly water soluble salt has a solubility in water of greater than 10 g/100 g at 20° C.

4. The process of claim 1, wherein the treated tailings has a salt-tailings concentration of the at least one highly water soluble salt of at least 1 wt %.

5. The process of claim 1, wherein the at least one highly water soluble salt includes sodium chloride.

6. The process of claim 1, wherein the treated tailings has a sand to fines ratio between 2.5:1.0 to 0.5:1.

7. The process of claim 1, wherein treating the tailings includes combining a stream of the oil sands tailings with a stream of an aqueous solution including the at least one highly water soluble salt and the at least one polymer flocculant and mixing the streams with sand.

8. The process of claim 1, comprising separating the process water from the consolidated material by any one or more of decanting, filtering, vacuuming, gravity draining, or electrofiltering.

9. The process of claim 1, wherein separating the process water from the consolidated material includes mechanically dewatering the consolidated material.

10. The process of claim 1, further comprising gravity draining the consolidated material to produce consolidated material having a solids content of at least 65% by weight.

11. The process of claim 1, further comprising recovering at least a portion of the separated process water, wherein the recovered process water includes the at least one highly water soluble salt.

12. The process of claim 11, further comprising recycling at least a portion of the recovered separated process water, which includes the at least one highly water soluble salt, to treat additional oil sands tailings.

13. The process of claim 11, further comprising purifying at least a portion of the recovered process water.

14. A process of consolidating oil sands tailings which include greater than 2 wt % of fines in process water, the process comprising:
    mixing the oil sands tailings, which result from extraction of bitumen from oil sands, with a highly water soluble ammonium based salt and polymer flocculant to consolidate the fines; and
    separating the process water from the consolidated fines to produce a solids content of at least 45% by weight, wherein the treated tailings has a salt-tailings concentration of the at least one highly water soluble salt of at least 0.5 wt %,
    wherein the highly water soluble ammonium based salt consist of, as the cation of the salt, a monovalent ammonium cation.

15. The process of claim 14, wherein the ammonium based salt is selected from ammonium chloride, ammonium bromide, ammonium carbonate, ammonium nitrate, ammonium sulfate, ammonium phosphate.

16. A process of consolidating oil sands tailings, the process comprising:
    combining oil sands tailings, which includes greater than 2 wt % of fines suspended in process water, with at least one highly water soluble salt and at least one polymer flocculant to form a treated tailings including consolidated fines from the process water,
    wherein the treated tailings has a salt-tailings concentration of the at least one highly water soluble salt of at least 0.5 wt %,
    wherein the oil sands tailings result from extraction of bitumen from oil sands, and
    wherein the at least one highly water soluble salt is an alkali halide salt.

17. The process of claim 16, further comprising separating and recovering at least a portion of the process water from the treated tailings, wherein the separated and recovered process water includes the at least one highly water soluble salt; and recycling at least a portion of the separated recovered process water, which includes the at least one highly water soluble salt, to consolidate solids of additional oil sands tailings.

18. The process of claim 16, further comprising treating the oil sands tailings with coarse particles to form a consolidated material including the consolidated fines, wherein the consolidated material has a solids content of greater than 60%.

19. The process of claim 16, wherein the treated tailings has a salt-tailings concentration of the at least one highly water soluble salt of at least 1 wt %.

* * * * *